Oct. 18, 1960     H. K. GLEASMAN     2,956,654
TWO-SPEED BICYCLE HUB TRANSMISSION AND BRAKE
Filed Feb. 11, 1958
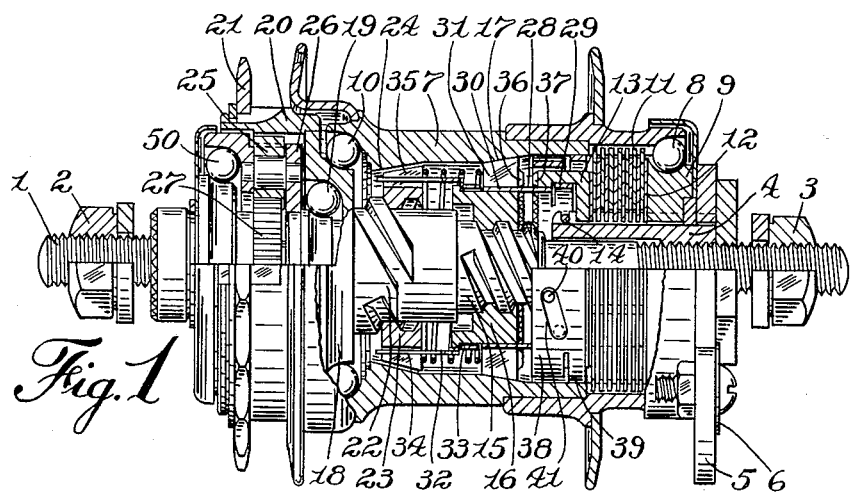
Fig. 1
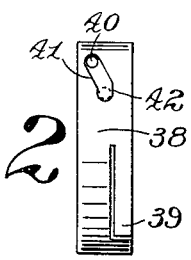
Fig. 2
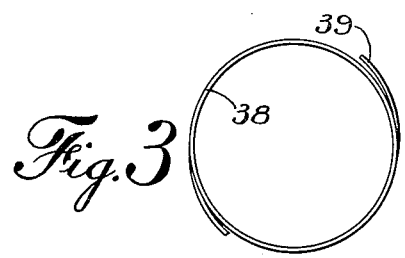
Fig. 3
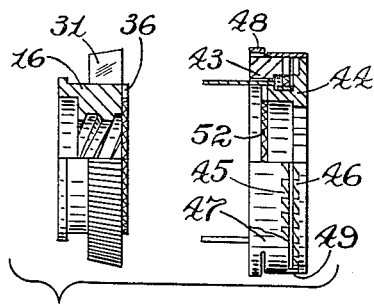
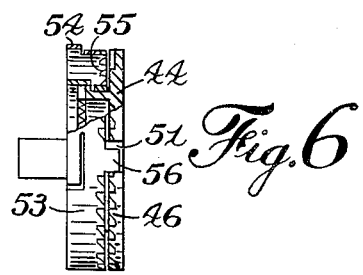
Fig. 6
Fig. 4
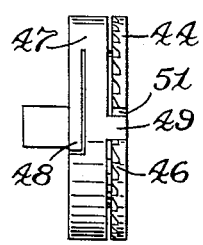
Fig. 5
WITNESS:
Esther M. Stockton
INVENTOR.
Hollis K. Gleasman
BY
Clinton S. Janes
ATTORNEY

United States Patent Office 2,956,654
Patented Oct. 18, 1960

2,956,654

TWO-SPEED BICYCLE HUB TRANSMISSION AND BRAKE

Hollis K. Gleasman, Elmira, N. Y., assignor to The Bendix Corporation, a corporation of Delaware Filed Feb. 11, 1958, Ser. No. 714,596

3 Claims. (Cl. 192—6)

The present invention relates to a two-speed bicycle hub transmission and brake, and more particularly to means for preventing the undesired actuation of the brake by backward rotation of the bicycle wheel.

In certain types of bicycle hub gearing, such as shown for instance in the patent to Olson 813,464 or in applicant's prior application Ser. No. 690,470, filed October 16, 1957, now Patent 2,903,913, if when the device is in high gear the bicycle is rolled backward, the backward rotation of the low speed screw shaft may cause its clutch nut to actuate the brake, and since the force exerted by the operator is multiplied by the ratio of the radii of the wheel and screw shaft, and by the mechanical advantage of the reduction gearing the brake may inadvertently be applied so firmly as to lock tightly and require disassembly to effect release.

It is an object of the present invention to provide a novel bicycle hub gearing and brake embodying means for preventing actuation of the brake responsive to backward rotation of the wheel, which is simple in construction and positive in action.

It is another object to provide such a device which is actuated by initial backward rotation of the vehicle wheel to block the brake actuating member out of operative position.

Further objects and advantages will be apparent from the following description taken in connection with the accompanying drawing in which:

Fig. 1 is a side elevation of a preferred embodiment of the invention partly broken away and in section showing the parts in low gear operating position;

Fig. 2 is a detail in side elevation of a modified form of blocking sleeve;

Fig. 3 is an end view of the same;

Fig. 4 is a detail partly in side elevation and partly in section of the low speed clutch nut and the brake actuating member with a modified form of blocking means for said clutch nut, in disassembled relation;

Fig. 5 is a similar detail of the brake actuating member and blocking means showing the parts rotated 90° from their positions in Fig. 4; and Fig. 6 is a detail similar to Fig. 5 showing a further modification of the blocking means.

In Fig. 1 of the drawing there is illustrated an axle 1 arranged to be clamped in the rear fork of a bicycle or the like by means of clamp nuts 2, 3. A brake anchor member in the form of a splined sleeve 4 is adjustably mounted on the axle and prevented from rotation by a torque arm 5 adapted to be connected to the vehicle frame by a clip 6 in the usual manner.

A hub member 7 is rotatably mounted on the axle 1 by means of a bearing 8 seated on a backing plate 9 splined on the anchor member 4, and a plurality of brake discs 11, 12 are splined alternately to the interior of the hub 7 and to the anchor sleeve 4, and are arranged to be compressed against the backing plate 9 by means of a brake applying ring 13 splined on the anchor sleeve 4 and retained thereon by a lock ring 14.

A low speed driving means for the hub is provided including a low speed screw shaft 15 rotatably mounted on the axle 1 and having threaded thereon a low speed clutch nut 16 formed with a conical surface adapted to engage a conforming surface 17 in the interior of the hub 7. A high speed driving means for the hub is provided comprising a driving member indicated generally by numeral 18, rotatably mounted on the low speed screw shaft 15 by means of bearings 19 and supporting the adjacent end of the hub 7 by a bearing 10. The driving member 18 has at its outer end an orbit gear member 20 adapted to be rotated by a sprocket 21, and is threaded adjacent its inner end to form a high speed screw shaft 22. A high speed clutch nut 23 is threaded on the high speed screw shaft 22 for movement into and out of engagement with a corresponding clutch surface 24 in the interior of the hub.

A plurality of planetary pinions 25 mounted on a planet carrier 26 fixed on the low speed screw shaft 15 mesh with the orbit gear 20 and with a fixed sun gear member 27 to thereby provide a reduction gear drive from the orbit gear 20 to the low speed screw shaft 15. A bearing 50 seated on the sun gear member 27 supports the outer end of the planet carrier 26.

Traversal of the low speed clutch nut 16, on rotation of the low speed screw shaft 15 to provide an automatically engaging clutch is assured by means of a drag sleeve 28 having a spring arm 29 bearing frictionally within the brake actuating ring 13 and having an arm 30 traversing a slot 31 in said clutch nut. To assure the automatic engagement of the high speed clutch nut 23 it has a similar frictional connection to the low speed clutch nut 16 by means of a drag member 32 having an arm 33 bearing frictionally on the low speed clutch nut and having an arm 34 engaging in a slot 35 in the high speed clutch nut 23.

The adjacent faces of the low speed clutch nut 16 and the brake applying ring 13 are provided with dentils 36, 37 respectively whereby backward rotation of the low speed screw shaft 15 causes the low speed clutch nut 16 to engage and couple itself to the brake applying ring 13, and further backward rotation of the low speed screw shaft 15 causes the ring 13 to compress the brake discs 11, 12 against the base plate 9 and consequently apply the brake.

As previously stated, if the vehicle is rolled backward while the high speed clutch nut 23 is in engagement with the hub 7, the backward rotation of the hub is transmitted through the high speed screw shaft 22 and driving member 18, and through the planetary gearing 20, 27, 25 to the low speed screw shaft 15 which may cause the low speed clutch nut 16 to forcibly apply the brake and lock the wheel from rotation. In order to prevent this from happening, a blocking sleeve 38 is mounted on the periphery of the brake applying ring 13, and is provided with a spring arm 39 bearing frictionally in the interior of the hub. The blocking sleeve 38 is connected to the brake applying ring 13 by means of a pin 40 fixed on the ring 13 traversing an inclined slot 41 in the sleeve 38. The inclination of the slot 41 is such that when the blocking sleeve 38 is rotated backward by initial backward rotation of the hub 7, by virtue of its frictional connection therewith through the arm 39, the sleeve 38 is moved toward the low speed clutch nut 16 causing the sleeve rim portion to abut the adjacent radial flange portion of the low-speed clutch nut and thereby positively holds the dentils 36, 37 of said clutch nut and the brake applying ring 13 out of engagement. This prevents the locking action above described.

If desired, the slot in the blocking sleeve 38 may be formed as shown in Fig. 2 with a dwell section 42 to make this blocking action still more positive.

In Fig. 4 of the drawing there is illustrated a modified form of blocking means in which an annulus 43 is journalled on the drag sleeve 28 which is mounted on the brake actuating ring 44, and said annulus and ring are provided with saw teeth 45, 46 respectively having flatted tops. A retarder ring 47 is fixed on the annulus 43 and provided with a spring arm 48 frictionally engaging the interior of the hub. The retarder 47 has a finger 49 (Fig. 5) engaging in a slot 51 in the periphery of the brake applying ring 44 with sufficient lost motion to permit the teeth 45, 46 to move from relative abutting relation to meshing relation.

When the annulus 43 is rotated backward by the retarder 47, as permitted by the lost motion of the finger 49 in the slot 51, the teeth 45, 46 will wedge themselves apart until their flatted top portions are brought into abutting relation with each other. The annulus 43 is thereby moved into the path of movement of the low speed clutch nut 16 to positively prevent its engagement with the dentils 52 of the brake applying ring 44, whereby application of the brake is prevented. On subsequent forward rotation of the hub 7 the teeth 45, 46 are brought into meshing relation, thus permitting application of the brake by backward rotation of the low speed screw shaft 15 in the usual manner.

As shown in Fig. 6, the blocking teeth may be formed on the retarder ring itself, rather than on the separate annulus 43. As there shown, a retarder and blocking ring 53 is rotatably fitted in the hub 7 and provided with spring arms 54 bearing frictionally in the interior of the hub. Teeth 55, formed on the adjacent side of ring 53 are arranged to cooperate with the teeth 46 of the brake actuating ring 44. The retarder ring 53 is also provided with a finger 56 cooperating with the slot 51 in the brake applying ring to control the relative rotary motion of the retarder and blocking ring 53. The operation of this embodiment of the invention is the same as set forth in connection with Figs. 4 and 5.

Although certain structure has been shown and described in detail it will be understood that changes may be made in the design and arrangement of the parts without departing from the spirit of the invention.

I claim:

1. In a two-speed gear transmission and brake for velocipedes or the like a fixed axle, a hub rotatably mounted thereon, a driving member, means for rotating the hub from the driving member in a forward direction including a high speed driving means, a low speed driving means for the hub, and reduction gearing connecting said high-speed driving means to the low-speed driving means; a brake for the hub; and means for actuating the brake responsive to backward rotation of the low-speed driving means, in which the low-speed driving means includes a screw shaft and a clutch nut threaded thereon for traversal into driving engagement with the hub responsive to forward rotation of the screw shaft, and into operative engagement with the brake actuating means responsive to backward rotation of the screw shaft; means movable into position to positively block the brake-actuating movement of the clutch nut, and means responsive to backward rotation of the hub for moving said blocking means into operative position.

2. A device as set forth in claim 1 in which the brake actuating means includes an annular member movable by the clutch nut to apply the brake, and said blocking means is in the form of a blocking sleeve mounted on said annular member, having an inclined connection therewith and having a frictional connection with the hub.

3. A device as set forth in claim 2 in which the annular brake actuating member is splined on the axle, and said actuating member and the clutch nut are formed with teeth which engage and prevent rotation of the clutch nut during actuation of the brake; and the connection of the blocking sleeve to said annular brake-actuating member is so inclined that backward rotation of the sleeve causes it to project toward the clutch nut and prevent its teeth from engaging those of the brake actuating member.

References Cited in the file of this patent
UNITED STATES PATENTS

| | | |
|---|---|---|
| 2,799,183 | Rhein et al. | July 16, 1957 |
| 2,865,477 | Hood | Dec. 23, 1958 |
| 2,865,478 | Hood | Dec. 23, 1958 |